United States Patent [19]
Hau et al.

[11] Patent Number: 6,160,878
[45] Date of Patent: *Dec. 12, 2000

[54] AUTOMATIC INTERNATIONAL REDIAL DISABLEMENT AND STATUS DELIVERY METHOD AND APPARATUS

[75] Inventors: Shubert A. Hau, Wayne; A. Helen McGrath, Summit; Alan B. Moshinsky, Somerville; Christine Patricia Peterson, Fords, all of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,127

[22] Filed: Aug. 28, 1997

[51] Int. Cl.$^7$ ...................................................... H04M 3/42
[52] U.S. Cl. ........................................ 379/201; 379/88.24
[58] Field of Search .............................. 379/209, 88.23, 379/207, 67.1, 88.16, 88.19, 88.2, 88.22, 88.2 V, 127, 142, 201, 843, 245, 355

[56] References Cited

U.S. PATENT DOCUMENTS

| | | |
|---|---|---|
| 4,166,929 | 9/1979 | Sheinbein ................................. 379/207 |
| 5,020,095 | 5/1991 | Morganstein et al. ................ 379/88.23 |
| 5,311,583 | 5/1994 | Friedes et al. ............................ 379/209 |
| 5,579,382 | 11/1996 | Tsukishima .......................... 379/201 X |
| 5,661,790 | 8/1997 | Hsu ........................................... 379/209 |
| 5,742,674 | 4/1998 | Jain et al. ............................. 379/201 X |
| 5,784,438 | 7/1998 | Martinez .............................. 379/209 X |

Primary Examiner—Scott L. Weaver

[57] ABSTRACT

A method of completing an international call comprises the steps of receiving one of a request to change the status of an international service or a request to provide system status. For example, in an international redial service, a subscriber may request that a redial service to a dialed international number be terminated. Also, in an international redial service, at the conclusion of a redial period for the service, apparatus for completing the international call may call the subscribing calling party and offer to initiate a new redial period. Other features of the method for completing an international call include the capability to permit the subscriber to receive an indication of the international service status or to change service parameters from default values.

38 Claims, 4 Drawing Sheets

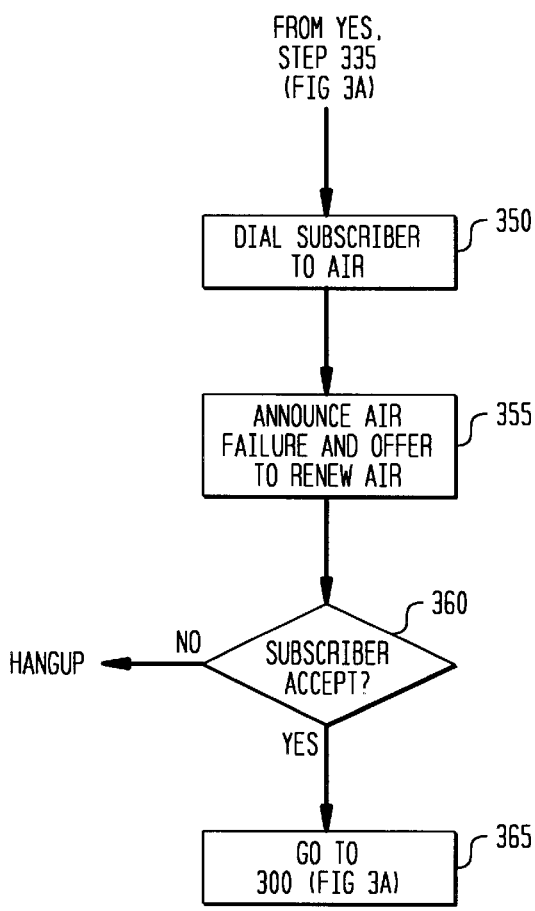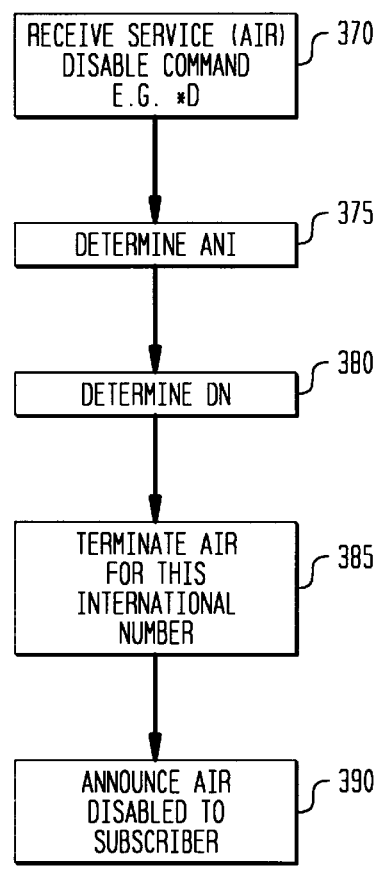

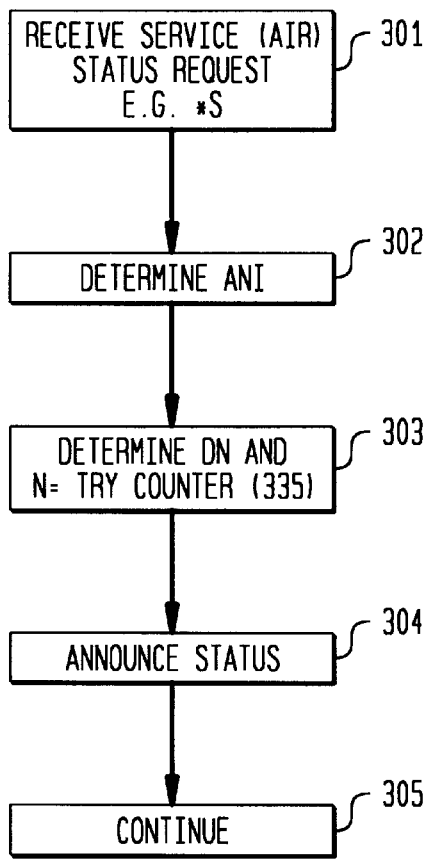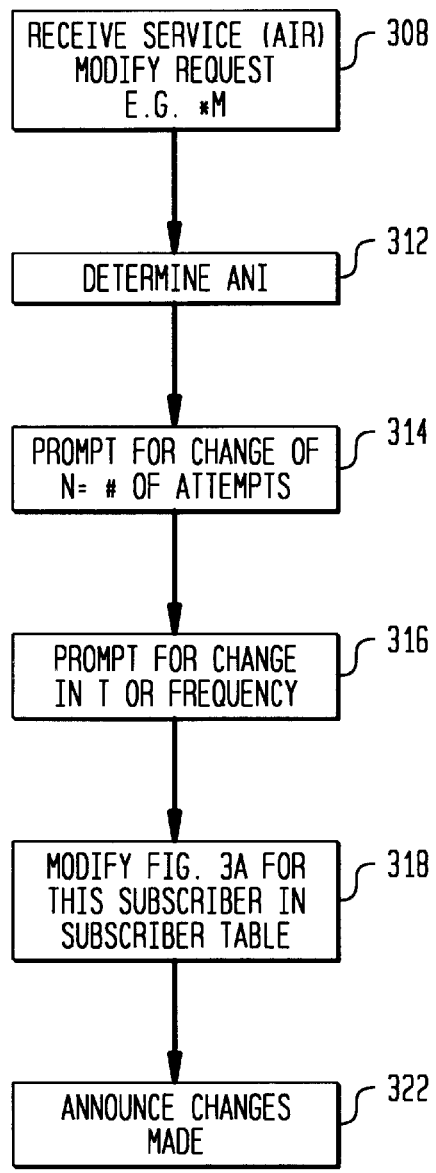

AUTOMATIC INTERNATIONAL REDIAL DISABLEMENT AND STATUS DELIVERY METHOD AND APPARATUS

BACKGROUND OF THE INVENTION

1. Technical Field

This invention relates to the field of international dialing services and, more particularly, to a method and apparatus for disabling an automatic international redial service for an international call, providing status of the automatic international redial service, permitting the subscriber to change service parameters and, at the end of a redial period, offering a further opportunity for automatic international redial service.

2. Description of the Related Arts

U.S. patent application Ser. No. 08/919,000, now U.S. Pat. No. 6,038,307 filed concurrently herewith describes an international redial system in which the cause of an international call failure is identified according to International Telecommunications Union (I.T.U.) standards. When an international call is placed, modem foreign networks return data representative of one of several reasons for a failure to complete an international call. According to the ITU-T recommendations, cause failure data may represent one of up to 127 individual causes for the failure of an international call, when the call does not go through. For example, cause value code number 17 relates to "user busy," that is, the called party is presently on their line and the line is busy for that reason. If there is a network busy problem, then a cause value code 42 is returned representing "switching equipment congestion." If the caller dials an invalid number, a cause code value of 28 is returned for "invalid number format."

Different countries have chosen to implement ITU-T recommendations in different ways. For example, the United Kingdom uses the ISUP (the Integrated Services Digital Network User Part) signaling system to indicate a cause failure reason as a "cause" value number. Other countries such as France use the TUP (Telephone User Part) signaling system in which reasons for call failures are indicated by the generation of an appropriate "signal code." Still other countries use the R2 (Register Signaling 2) signaling system in which "B-signal" codes represent reasons for call failures. All of these may be translated into an indicative signal code. Hereinafter, any one or any other data indicative of a reason for the failure of an international call shall be referred to herein as "unsuccessful call reason information."

It is also described in the '000 application that an international service is presently available from AT&T known as AT&T International Redial (AIR) service. AT&T long distance customers may presubscribe to AIR service. When a subscriber is unsuccessful in completing an international call, AT&T can check to be sure the subscriber has presubscribed and then prompt the subscriber: "If you would like to use AT&T International Redial service, please press *234." If the caller presses *234, the redial service automatically attempts to redial the call, for example, up to ten times in a half hour period. Of course, the system parameters for number of calls and period between call attempts may vary from system to system. The number of redial attempts (for example; ten) times the redial interval (for example, every three minutes) will be defined herein as the automatic redial period (for example, thirty minutes). While the caller is waiting for their international call to go through, the caller may occupy themselves with other tasks. With AIR service, the caller does not have to continuously have to place the call until the call goes through, the network does, and calls the caller back when the call is answered by the called party.

Once the subscriber has initiated the service, the subscriber may hang up and await a call from an adjunct indicating the called party has been reached and the international call may be completed. During the time period the AIR service is activated but the subscriber has not been rung back due to reaching the called party, the caller may not think anything is happening in regard to his request, may be suddenly required to attend to other business and wish to disconnect the service or otherwise wish to change the status of the AIR service request (for example, to terminate the request) or wish to receive an indication from the network as to the present status of the international redial service. Also, once the automatic redial period is over, the subscriber may wish to be advised of such status and offered an opportunity to continue AIR service.

Consequently, it is an object of the present invention to increase the likelihood of realizing revenues from a caller's placing an international call. It is a further object to assist the user in making an international call by making an international call as caller friendly and as automatic for the caller as possible. It is a further object to permit the caller to terminate service once the subscriber has initiated the service. It is a still further object to provide a service status announcement upon request or automatically at the end of a redial period. It is a still further object to offer another AIR redial period immediately at the conclusion of an automatic redial period.

SUMMARY OF THE INVENTION

According to a method of placing an international call which accomplishes the objects and features sought, a caller subscribes to a known international redial service and triggers such service, for example, by signaling a domestic network via an appropriate input command such as *234 and hang up. Thereafter, according to the present invention and while the AIR service is activated, the subscriber may change the status of the service, for example, terminate the service by entering a predetermined command such as *D via their telephone keypad. A network adjunct of the present invention determines the caller's ANI, ascertains that the caller with that ANI is a subscriber and has initiated AIR service, determines the directory number of the international called party and terminates the AIR service. The caller is further provided with an announcement or other indicator that AIR service has been disabled.

Moreover, while the AIR service is activated, the subscriber may determine the status of the service by entering a predetermined command such as *S via their telephone keypad. In a similar manner to changing the status of the AIR service, the adjunct determines the ANI, sees that the subscriber has activated AIR and provides a status announcement, for example, of the number of attempts tried during this redial period and the international directory number dialed.

Also, once the redial period is terminated, the adjunct may call the subscriber to indicate the termination of the redial period. The subscriber may then be given an opportunity to initiate a new redial period, change the status of the AIR service, hang up or take other appropriate action.

By permitting the AIR service subscriber the opportunity to modify the AIR service they have activated, the subscriber is able to save network resources and perhaps save a portion of a service fee, for example, if they terminate during the service period. Moreover, the subscriber is able to modify the service to their own needs and so personally customize its operation.

By permitting the AIR service subscriber an opportunity to determine the status of AIR service, the service becomes more user friendly and provides useful information to the caller at a particular point in time. Moreover, if the point in time is the end of the redial period and the subscriber initiates a new AIR redial period, the toll carrier may obtain increased revenues, for example, from the eventually successful call.

Also, by implementing all of these improvements to AIR services, it is likely that AIR service will become more attractive to subscribers and the subscriber base consequently increase.

The method of placing an international call may be implemented at a network adjunct call processor associated with any switching office utilized in establishing an international call and preferably associated with an international gateway switching center. The network adjunct processor of the present invention comprises interactive voice systems for making announcements/prompts such as: "Redialing to the following number has stopped" and then announce the dialed number and alternative or other prompts/ announcements as believed necessary. Also, a database management system of the adjunct stores the initially dialed digits of the called party's international number for redialing. These elements of the adjunct are coupled together and with the toll network by data transport facilities. Moreover, the apparatus for accomplishing the present method may be implemented within the software and hardware of the international gateway switch itself, for example, a #4ESS electronic switching system available from Lucent Technologies, Inc.

These and other features of the present invention will be explained with reference to the drawings.

BRIEF DESCRIPTION OF THE DRAWINGS

FIG. 3 represents a call processing flowchart for describing call processing activities of adjunct 60 according to one embodiment of the present invention where

DETAILED DESCRIPTION

Figure 1:
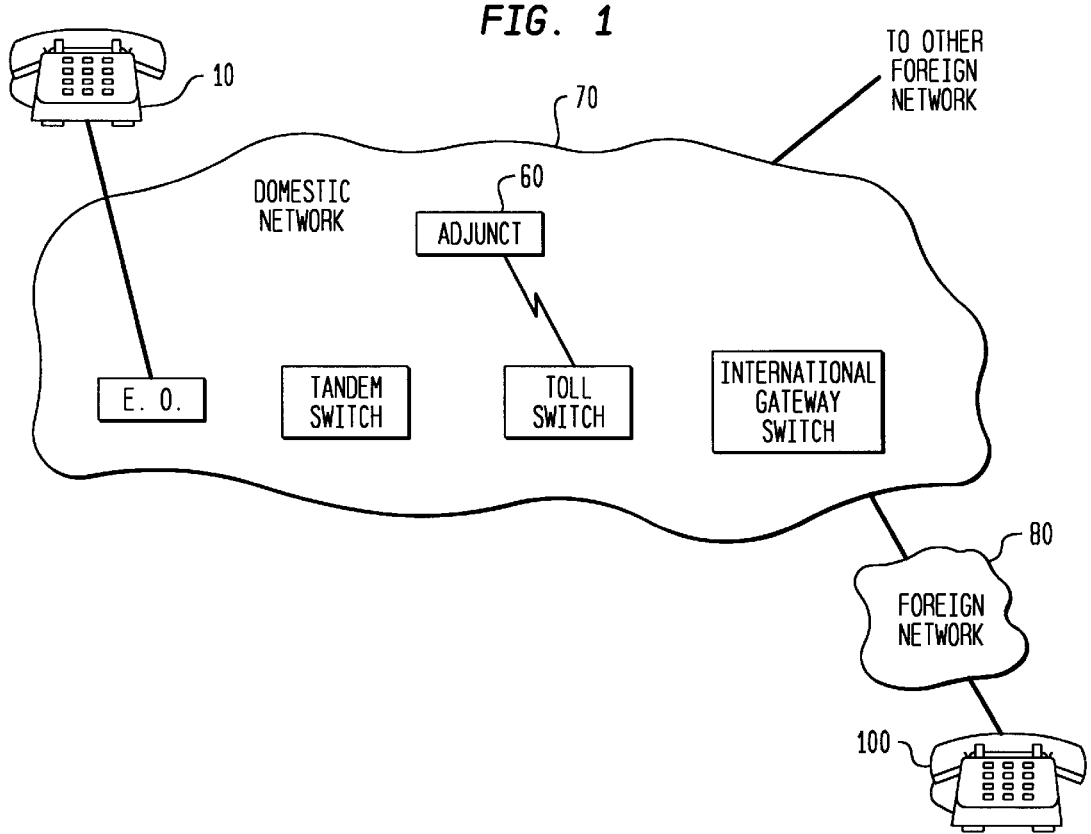
FIG. 1 represents a schematic drawing of a typical telephone network comprising domestic network 70 and foreign network 80 useful for explaining an international call completion according to the present invention, the domestic network 70 including an international gateway switching center 50 and an associated network adjunct processor 60 in accordance with one embodiment of the present invention.

Referring to FIG. 1 there is shown a typical world-wide telephone network comprising a domestic switched telephone network 70 and a foreign telephone network 80. Of course, domestic switched telephone network 70 may connect to multiple foreign telephone networks 80, only one of which is shown, for each country in the world. The International Telecommunications Union (sometimes referred to as the ITU or the UIT, formerly the CCITT) of the United Nations assists the various countries of the world in agreeing to uniform standards for international call processing. In the United States, a caller at station 10 dials 0-1-1 in order to signal an end office 20 in his local exchange area that he wishes to place an international call. The immediately following series of digits represent a country code and a city or region code. These digits are followed by the telephone number of the called party that the caller wishes to reach.

Traditionally, once the end office 20 receives the digits 0-1-1, the end office 20 knows that it is to forward the following digits to a toll switch 40 (sometimes via a tandem switch 30) which in turn forwards the dialed digits to an international gateway switching office 50 that can connect to a selected foreign telephone network 80 represented by the following country code digits. The end office 20, for example, may signal the international gateway toll center 50 via either an inband or a more modern out-of-band signaling system. The end office 20 may forward the dialed digits and automatic number identification (ANI) data identifying the calling party 10 by their telephone number.

When the international gateway switching office 50, for example, a #4ESS switch available from Lucent Technologies, Inc., receives the country code, city/region code and telephone number, office 50 is in a position to look both ways to establish links to the caller 10 via other network elements, if not already established, and the called party 100. In prior art in-band signaling, the communication links through tandem switching offices 30 and toll switching offices 40 are determined at the time of signaling international gateway switch 50. That is, the end office 20 attempts to reach gateway 50 by establishing successive communication links through, for example, tandem office 30, toll office 40 and finally to international gateway switch 50. In more modern out-of-band signaling systems, such as SS-7, the communication links are determined after signaling. In either event, the talking path between caller 10 and the gateway 50 are typically determined at the time or before the gateway office 50 begins to reach the foreign network 80. The international gateway switching center 50 then signals the foreign telephone network 80 by forwarding the dialed city/region code and telephone number of the called party.

The present invention, as will be further described in detail in connection with a discussion of FIG. 3, relates to what happens in the event a domestic caller 10 has subscribed to AIR service and wishes to request or change the status of the service or receive the status at the end of a redial period and be offered the opportunity to initiate a new redial period. If the subscriber/caller has subscribed to AIR service, a network adjunct 60 offers the caller 10 an opportunity to dial *234 for automatic international redial service and the foreign called party's number will be automatically redialed, for example, up to ten times over a half hour period. The system parameters for the number of times and the period between calls or the frequency of redialing may be predetermined and stored at default levels according to the service offering. According to the present invention as will be explained in greater detail herein, and after the subscriber has subscribed to AIR service, the caller change the system parameters within certain limits, may disable initiated service.

Figure 2:
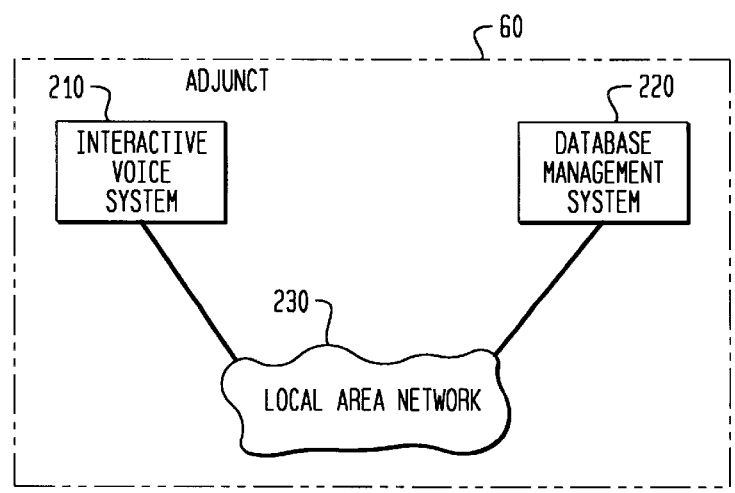
FIG. 2 represents a functional block diagram of a network adjunct processor 60 introduced in FIG. 1.

Referring to FIG. 2, system functions related to automatic international redial services are, in one embodiment, performed by a network adjunct processor 60 associated with domestic network 70. As such, adjunct 60 may be a shared resource of toll switches 40 dispersed in domestic network 70. Although network adjunct 60 is illustrated as comprising part of the domestic network 70, the features of adjunct 60 may be provided by stand-alone equipment if desired. Alternatively, the functions described as associated with adjunct 60 may be similarly provided at any alternative office in the domestic network 70 including end office 20, tandem office 30, toll office 40, gateway switch 50 or an office of the foreign network 80.

Adjunct 60 comprises an interactive voice system 210 that may or may not be conversant, as it may simply provide announcements responsive to a network condition or call processing event, or it may prompt the user or caller for further input and thus be conversant. Interactive voice systems are known, for example, from Lucent Technologies Inc. or Nortel. The caller or called party may respond by utilizing their touchtone keypads or, with speech recognition circuits included in the interactive voice system 210, the caller may speak a response to a prompt that may be interpreted by the interactive voice system 210. If dual tone multifrequency (DTMF) signaling is used, the interactive voice system 210 may comprise dual tone multifrequency receivers for receiving the touchtone signals initiated by the caller in response to a prompt. Database management system 220 processes and maintains timers, subscriber records, call status tables, called party dialed address digit data, country/language/time of day tables and the like among other data. A local area network 230 supports data communications between elements of the adjunct 60.

Now referring to FIGS. 1 and 3, the call processing method for providing automatic redial services will be explained in greater detail. FIG. 3(*a*) provides an overview of a known automatic international redial (AIR) service. First, it must be assumed that a subscriber has initiated service by subscribing to the service via known means, the Internet, contacting a toll carrier via a telephone or a writing or otherwise subscribing. Once the subscriber has subscribed, a subscriber database, for example, accessed via adjunct 60, or database management system 220 is updated to reflect the service type subscribed-to for the ANI or directory number or equivalent of the subscriber. As is known, a subscriber initiates and a domestic network 70 receives a command to initiate AIR service. For example, a subscriber may enter a command by depressing keys of a keypad such as *234 or voicing a request or otherwise requesting AIR service for reaching an identified directory number for an international called party 100. Once the commands are received at, for example, adjunct 60, according to step 300 and the subscriber is cleared for service, the process proceeds to step 310. A timer or call frequency indicator may be set, for example, to a redial attempt interval of every three minutes (20 attempts per hour). This is a system parameter that may be set at a default value and variable within predetermined limits such as from two minutes to five minute intervals. The AIR timer is reset to zero at step 310 and the process continues to step 320. When the timer reaches three minutes, an attempt is made to reach the called party 100. If the call is successful at step 325, then, the calling party is connected and connected to the call at step 340. After the call is completed and one party hangs up, the call is billed at step 345.

If the call is unsuccessful, then the process proceeds to step 330 where an attempt counter, starting at zero, is incremented from N=0 by one for one attempt. At step 335, if the default value for the count N is not exceeded, then step 310 is reentered, the timer reset and another attempt is made to reach the called party 100. This process proceeds until the count N is reached or the call is successful according to the prior art. In accordance with the present invention, at any time during the process at points a–f, the calling party 10 may pick up their phone and enter a new command. For example, the command may be to change the status of the service (FIG. 3(*e*)), terminate the service (FIG. 3(*c*)) or receive a status indication (FIG. 3(*d*)). Moreover, according to the present invention, once the redial period is completed at step 335, an adjunct 60 may dial the calling party to indicate status information, for example, the conclusion of the redial period and/or the reason for the failure (such as station busy or network congestion per U.S. patent application Ser. No. 08/919,000 and offer to reinitiate AIR service per FIG. 3(*b*).

Figure 3A:
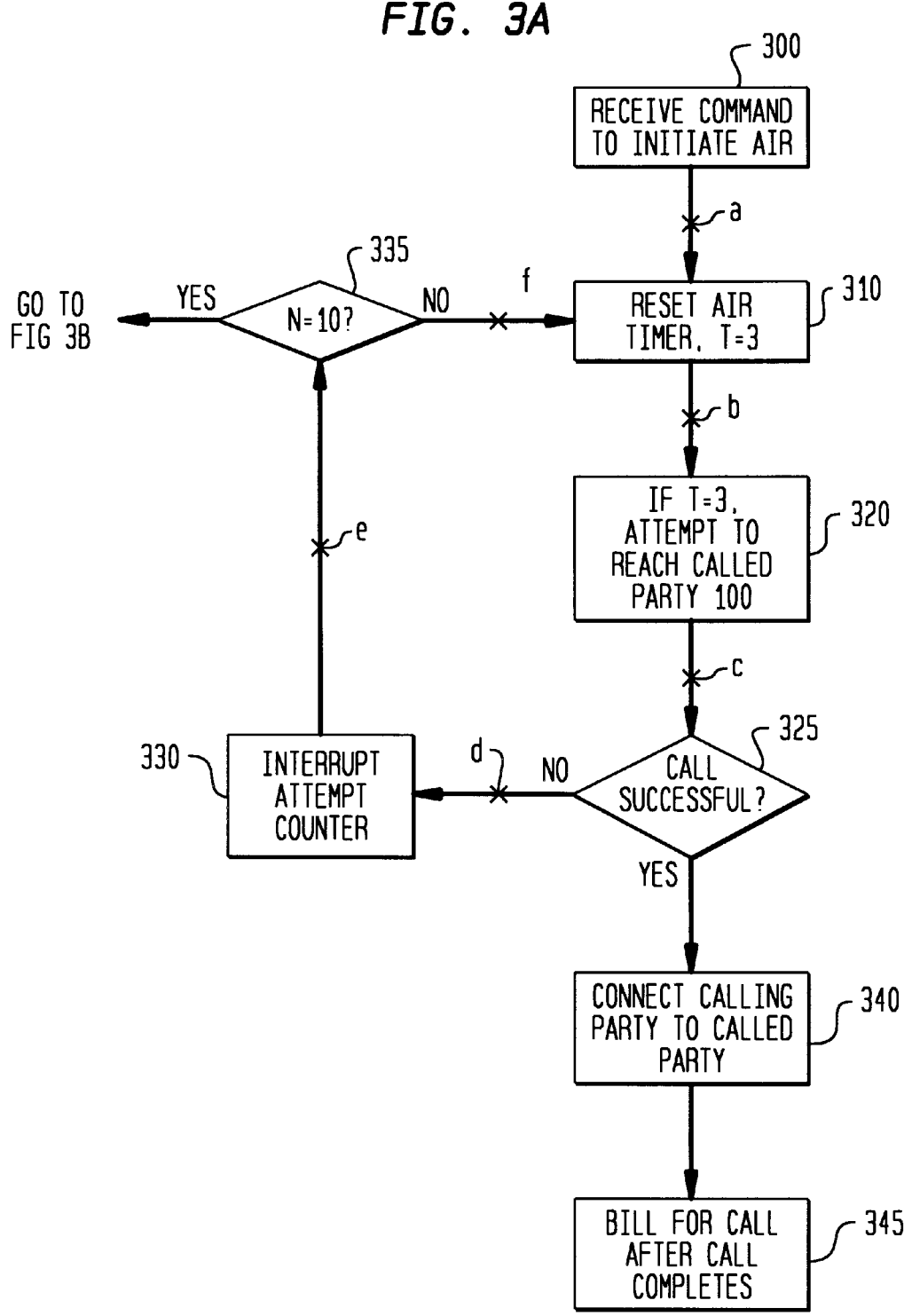
FIG. 3(a) shows a known AIR service process as modified at any of points a–f in the process to permit AIR service change or status delivery per FIGS. 3© and 3(d) respectively and status delivery at the end of the redial period per FIG. 3(b).

Referring first to FIG. 3(*e*), there is shown an exemplary flowchart for modifying AIR service within predetermined limits. In this embodiment, at any time after subscription to service including points in time a–f, the subscriber 10 may pick up their phone and enter a command to modify their AIR service. The command entered, for example, at step 308 may be *M. A subscriber record is immediately referred to. If the subscriber has subscribed to more than one service, the adjunct 60 may request information as to which service the subscriber wishes to modify. Alternatively, the subscriber may enter an elongated code sequence or via alternate means identify the service along with the request. The adjunct 60 determines the subscribers ANI from a serving end office 20 at step 312 and does a record look-up in a subscriber database. The record look-up may indicate a default value for N and for T (or frequency) stored in the subscriber's records or another value set by the subscriber. It may be preferable to permit certain ranges in the parameters N and T, for example, where the redial interval T may be between two minutes and five minutes and the number of attempts be between one and twenty. At step 314, there may be an announcement provided of the current number of attempts set in subscriber memory in addition to a request for a new number along with an indication of the permissible range. Similarly, at step 316, there may be an announcement provided of the current redial interval, a permissible range in interval durations and a prompt for an entered number by the subscriber. Once the subscriber has entered their selections, the process of FIG. 3(*a*) will be modified at step 318 according to the new entries in the subscriber's AIR service table. Following the changes, an announcement may be provided at step 322 of the changes made.

Also, at any points in time a–f or even at other times as well so long as the caller has subscribed to AIR service and especially during provision of AIR service, a subscriber may request that service for redialing an entered international directory number be terminated. This is shown in FIG. 3(*c*). At step 370, the adjunct 60 receives a redial termination command by keypad entry, voice or alternative means, for example, *D. At step 375, the ANI is determined and the subscriber records obtained for that ANI by the adjunct 60. If the subscriber has initiated an AIR service then a dialed international directory number will be returned at step 380 by the database 220. If not, then, there may be provided an announcement that AIR service has not been initiated to redial any number. If AIR service is in process at the time of receipt of the *D command, then at step 385, AIR service provision will be terminated and the timer T reset to zero. Once the redial is terminated at step 390, an announcement of the service termination may be provided to the caller including the called party number, the number of attempts tried, whether the subscriber will be billed and the like.

Referring to FIG. 3(*d*), there is shown a process whereby at any point in time, including especially points in time during which AIR service is actuated (points a–f), a status check may be requested and data offered to the AIR subscriber. The subscriber may initiate the request for status by, for example, entering *S at step 301. Other commands by keyboard, voice entry or other means may be entered in the alternative. As already described, the adjunct 302 determines the ANI for the calling party and checks their subscriber records. If there is no AIR service in process, the adjunct arranges to announce that status. At step 303, if AIR service is in progress, then at step 303, the dialed international number is determined as well as the number of attempts already tried. At step 304, a status announcement may comprise the dialed number, the number of attempts made and the redial interval and remaining redial period among other status indicators as appropriate or requested. The process continues at step 305 unless terminated by a *D command.

Now referring to FIG. 3(*b*), there is shown an enhancement to AIR service whereby at the end of the redial period at step 335 of FIG. 3(*a*) an adjunct 60 automatically offers to deliver status and offers to reinitiate AIR service for an identified dialed international number. As the redial period terminates, the adjunct dials the calling party at step 350 and delivers an announcement at step 355 as to status. The status may comprise the number of attempts made, the dialed number and other information including the fact that the redial period has expired. Also, at step 355, the subscriber 10 may be offered the opportunity to renew AIR service for another service period for the identified dialed international number. Of course, they may also enter *M, change the parameters, hang up or take any other action permitted by the present invention. At step 360, if the subscriber accepts the AIR redial offer, the process of FIG. 3(*a*) begins anew. The subscriber may refuse by entering *D or hanging up or other indication.

The foregoing is merely illustrative of the principles of the invention and various modifications can be made and come to mind to those of ordinary skill in the art from studying the present specification and without departing from the scope and spirit of the invention. For example, different informative messages and types of international redial services may be provided by adjunct 60 in response to different network conditions. Different hardware may be used than shown and suggested which may comprise hardware, firmware or software implementations of the present method. Any United States patents or patent applications cited herein should be deemed to be incorporated by reference as to their entire contents. The invention should only be deemed to be limited in scope by the claims which follow.

What we claim is:

1. A method of monitoring information about placing of an international call comprising steps of:
    receiving a request for a change of a redial service status from a subscriber to an international service, the request for a change of the redial service status including at least one of a request for a change of a redial attempt interval duration stored in a memory and a request for a change of a number of redial attempts stored in the memory; and
    changing the service status.

2. A method as recited in claim 1 wherein said service status change step comprises the step of receiving and recognizing a predetermined key sequence.

3. A method as recited in claim 2 wherein said predetermined key sequence represents a request for changing system parameters.

4. A method as recited in claim 3 wherein said system parameters comprise one of the redial attempt interval duration and the number of redial attempts.

5. A method as recited in claim 3 wherein each of said system parameters is variable within a predetermined range.

6. A method as recited in claim 1 further comprising the step of determining automatic number identification information for said subscriber.

7. A method as recited in claim 6 wherein in the event said subscriber has not initiated said international service, then the method comprises the step of announcing the service status to the subscriber.

8. A method as recited in claim 6 further comprising the step of determining a dialed international number.

9. A method as recited in claim 8 further comprising a step of determining a number of attempts to reach said dialed international number.

10. A method as recited in claim 1 wherein said request for change of service status comprises a request for modifying system parameters.

11. A method as recited in claim 10 further comprising the step of
    announcing the modification of system parameters after the system parameters have been modified.

12. A method as recited in claim 1 further comprising the step of
    storing a dialed international number for redialing.

13. A method of completing an international call comprising the steps of
    determining the completion of a predetermined redial period of a service,
    ringing a calling party subscribing to said service upon the completion of the redial period and
    offering to renew the redial period.

14. A method of completing an international call as recited in claim 13 further comprising the step of
    announcing redial service status to the calling party after the calling party answers.

15. A method of completing an international call as recited in claim 13 further comprising the step of
    initiating a new international redial period upon receipt of an indication of acceptance by the subscriber.

16. A method of completing an international call as recited in claim 13, further comprising steps of:
    renewing the redial period; and
    connecting an international called party to the calling party.

17. An apparatus for monitoring information about placing of an international call comprising:
    a processor for receiving a request for a change of a redial service status, the request for a change of the redial service status including at least one of a request for a change of a redial attempt interval duration and a request for a change of a number of redial attempts; and
    an announcement circuit to announce the change of the redial service status.

18. Apparatus as recited in claim 17 further comprising a memory for storing a dialed international number.

19. Apparatus as recited in claim 17 further comprising a memory for storing service parameters and service status.

20. Apparatus as recited in claim 19 wherein said stored service parameter is updated to a new stored value responsive to data entered by a service subscriber.

21. Apparatus as recited in claim 20 wherein said processor determines if subscriber entered data of a particular type is within a predetermined range.

22. Apparatus as recited in claim 17 wherein said processor, responsive to a predetermined command, terminates international service in progress.

23. Apparatus as recited in claim 17 wherein said announcement circuit announce to the calling party the status of the call and a redial service to establish communication links between the calling party and an international called party.

24. An apparatus for monitoring information about placing of an international call comprising:

a processor for receiving a request for one of a change of international service status and an indication of international service status, the international service status including at least one of a redial attempt interval, a redial timer, a redial attempts number, a redial attempts count, and a redial service termination status; and an announcement circuit for announcing one of a change of international service status and of international service status, wherein said processor, responsive to the completion of a redial period, signals said announcement circuit to announce an offer for continuing international redial service.

25. Apparatus as recited in claim 24 wherein said announcement circuit further announces international service status.

26. A method of monitoring information about placing of an international call comprising steps of:

receiving a request from a subscriber for one of a change of an international redial service status and an announcement of the international redial service status, the international redial service status including at least one of a redial attempt interval, a redial interval timer, a redial attempts number, and a redial attempts count; and determining automatic number identification information of the subscriber;

determining whether the subscriber had initiated the international service based on the automatic number identification information;

announcing the service status when the subscriber had not initiated the international service;

recognizing a predetermined key sequence when the subscriber had initiated the international service;

performing one of announcing the service status and changing the service status according to the recognized predetermined key sequence.

27. A method of monitoring information about placing of an international call comprising steps of:

receiving a request for a redial service status from a subscriber to an international service, the request for the redial service status including at least one of a request for a redial attempt interval, a request for a remaining redial period, and a request for a number of redial attempts already tried; and announcing the service status.

28. A method as recited in claim 27 further comprising a step of determining automatic number identification information for said subscriber.

29. A method as recited in claim 28 wherein the step of announcing the service status announces the service status to the subscriber when the subscriber has not initiated the international service.

30. A method as recited in claim 28 further comprising a step of determining a dialed international number.

31. A method as recited in claim 30 further comprising a step of determining a number of attempts to reach said dialed international number.

32. A method as recited in claim 27 further comprising a step of storing a dialed international number for redialing.

33. An apparatus for monitoring information about placing of an international call comprising:

a processor to receive a request an indication of a redial service status, the request for an indication of a redial service status including at least one of a request for an indication of a redial attempt interval, a request for an indication of a remaining redial period, and a request for an indication of a number of redial attempts already tried; and an announcement circuit to announce the indication of redial service status.

34. Apparatus as recited in claim 33 further comprising a memory to store a dialed international number.

35. Apparatus as recited in claim 33 further comprising a memory to store service parameters and service status.

36. Apparatus as recited in claim 35 wherein a stored service parameter is updated to a new stored value responsive to data entered by a service subscriber.

37. Apparatus as recited in claim 36 wherein said processor determines if the service subscriber entered data of a particular type and is within a predetermined range.

38. Apparatus as recited in claim 33 wherein said announcement circuit announces to a calling party the status of the call and a redial service to establish communication links between the calling party and the international called party.

\* \* \* \* \*